United States Patent Office

2,876,103
Patented Mar. 3, 1959

2,876,103

PROCESS OF MAKING LIQUID-FILLED CRUSTLESS CONFECTIONERY

Julius Rosenheim, Vienna, Austria, assignor to Gustav & Wilhelm Heller, Vienna, Austria, a firm No Drawing. Application May 1, 1957
Serial No. 656,218

Claims priority, application Austria November 2, 1956

8 Claims. (Cl. 99—134)

This invention relates to liquid-filled crustless confectionery, such as chocolate confectionery, and to a method of making the same.

Confectionery with a liquid filling may be made by introducing the filling into an upwardly open base portion consisting for instance of chocolate and by placing a preheated top on to the likewise preheated base portion. Although this method permits confectionery with a liquid filling to be produced it nevertheless has the disadvantage that its performance requires the assistance of a large number of operators or of costly machinery.

Another known method of making confectionery with a liquid filling is to roll a mass of sugar, obtained by evaporation to dryness in a vacuum, of a sugar syrup solution, into a thin sheet, to wind the sheet on to a copper pipe, to withdraw the body of sugar thus obtained in the form of a continuous tube and at the same time to provide the same with a filling by forcing the latter through the copper pipe by means of filling pumps and finally to form the filled tube of sugar into confections in a stamping device. The confection thus made can then be provided with a covering, for instance of chocolate. This method is comparatively simple to perform but its application in the past has been confined to confections with fairly thick and viscous fillings and with a fairly thick sugar crust beneath the chocolate covering.

It has now been found that it is possible in a simple way, and also in the manner that has been described, to produce completely enclosed crustless confections covered with chocolate or similar material, i. e. confections that have no inside sugar crust, by using a filling material of initially high viscosity which gradually liquefies, generally in the course of a few hours, and then dissolves away the sugar crust.

The invention provides liquid-filled crustless confectionery, which comprises a non-crusty covering and a liquid filling surrounded by and contacting said covering and consisting of a mixture of swellable material of the class consisting of solubilized, i. e. hydrolized starch and pectins, a filling material adapted to cause and having caused said swellable material to swell, and sugar dissolved in said filling material.

The invention provides further a method of making liquid-filled crustless confectionery which comprises filling a soluble sugar crust with a mixture comprising a swellable material of the class consisting of solubilized starch and pectins on the one side, and a filling material adapted to cause said swellable material to swell on the other side, which mixture liquefies and dissolves said crust.

In this connection a sugar crust is considered soluble, if it is soluble in said filling material.

The non-crusty covering may consist, e. g., of chocolate.

The solubilized starch may consist of corn flour.

The filling material may consist of milk or sugar solutions, and may contain other filling substances such as cocoa powder or a nougat mass, flavoring substances and/or fruit or fruit pulp.

The method of the present invention preferably makes use of the aforedescribed procedure which consists in the consecutive steps of rolling a sugar or sugar syrup mass into a thin sheet, winding the same over a pipe, withdrawing it in the form of a continuous tube, filling by means of a pump, and then conveying it to a stamping device, whereupon the confection thus obtained is provided with a covering.

In this connection it may be mentioned that it has already been proposed to make dessert confectionery with a liquid filling without a sugar crust by emptying the sugar syrup through a hole from the inside of a solidified sugar body produced from a clear boiled sugar solution in powder form and in then introducing a liquid such as a liqueur into the cavity inside the body thus obtained, whereupon the hollow body is completely coated with a covering so that the sugar crust under the covering can be dissolved by the liquid inside whilst the covering sets.

However, the hereindescribed method permits the chocolate covering to be replaced by a covering of other materials such as a cocoa mass or a fat-containing nougat mass made of nuts or dried fruit such as almonds, hazel nuts, groundnuts and the like. Moreover, the thickness of the covering of confectionery in accordance with the present invention may be substantially less than that of the hitherto obtainable hollow confections. Sugar solutions which cause the starch or pectins contained in the filling to swell may be either aqueous or alcoholic sugar solutions.

Preferably a filling is used for making the crustless confectionery of the present invention, which contains a maximum of 40% dry matter. The filling is prepared by boiling up the hydrolized starch or pectins with the filling materials which act as the swelling agents, such as milk, possibly with the addition of the other above mentioned substances, until the desired content of dry matter has been reached.

The dissolution of the sugar crust can be accelerated by introducing into the filling material or into the crust substances which are adapted to promote the absorption of water from the filling material. Such substances may be alcohols such as for instance glycerine or sorbitol. These materials are introduced into the sugar crust by adding them to the sugar mixture that is used for making the crust. Esters of higher fatty acids, such as sorbitol ester, may likewise be added to the mixture.

Wholly enclosed crustless confectionery produced by the hereindescribed method excels by its extremely good keeping properties. The most convenient and economic way of producing the same is by means of the aforedescribed known method employing a stamping device, but it is also possible first to make a bottom, to fill this with the filling, and then to place a top over the filled bottom.

The invention will now be more particularly described with reference to the following examples:

*Example 1*

An aqueous solution of saccharose and glucose is evaporated until dry, whereupon a mass is obtained from which an elongated casing is made in the manner known in the manufacture of hard caramel. This is then filled through a filling pipe and conveyed to the stamping dies and provided with a covering of chocolate.

The mass used for the filling is made as follows: 0.3 kg. of corn starch is mixed with 3 kg. of sugar and the mixture is swelled or dissolved in 7 kg. of water. 80 g. of citric acid and 50 g. of cherry flavor are then added to the mass thus obtained. The resultant filling contains 33% dry matter.

Owing to the composition of the filling the crust of saccharose and glucose soon begins to dissolve.

Example 2

The method described in Example 1 is repeated as explained except that a filling is introduced which is obtained by mixing 1.30 kg. cane sugar,
0.30 kg. corn starch, and
6 kg. of water, with an addition of
2 kg. of strawberry marmalade,
0.50 kg. of crystallised strawberries,
0.08 kg. of citric acid, and
0.015 kg. of strawberry flavor.

This filling contains about 30% dry matter.

Example 3

The method described in Example 1 is modified in that the filling used consists of the following ingredients:

0.30 kg. corn starch,
2 kg. cane sugar,
0.70 kg. cocoa mass,
0.05 kg. vanilla essence,
7 kg. of water.

This filling has about 30% dry matter.

Example 4

The method described in Example 1 is repeated as explained, with the exception that the filling used consists of the following ingredients:

5 kg. fruit pulp,
0.07 kg. dry pectin,
0.02 kg. invertase,
2 kg. cane sugar,
3 kg. water.

Example 5

The method described in Example 1 is modified in that the filling described in Example 4 contains in each 100 kg. an addition of 0.42 kg. chemically pure glycerine and fruit flavor.

Example 6

The method described in Example 1 is performed with a filling of the kind set forth in Example 5, with the variation that the filling besides fruit flavor still contains an addition of sorbitan-tristearate.

Example 7

The method described in Example 1 is modified in that the covering is formed of a cocoa mass.

Example 8

The method described in Example 1 is modified in that the covering is formed of a fat-containing nougat mass.

Example 9

The method described in Example 4 is modified in that the cane sugar and water are replaced by 4 kg. of milk.

What is claimed is:

1. The process of making liquid-filled crustless confectionery, which comprises rolling an essentially dry mass of sugar, obtained by evaporating a sugar syrup solution in vacuo, into a thin sheet, winding said thin sheet on to a pipe, withdrawing from said pipe the body of sugar thus obtained in the form of a continuous tube, closing said continuous tube of sugar on one end and filling the tube as it is withdrawn from the pipe with a filling which is forced through the pipe, said filling containing a swellable material selected from the class consisting of solubilized starch and pectins, and a material adapted to cause a swelling of said swellable material, the viscosity of said filling being initially high and gradually decreasing due to reaction of said swellable material with said swelling material until a liquid-thin state is reached, forming said continuous tube of sugar filled with said filling of high viscosity into confectionery consisting of said filling covered with a crust of sugar, and providing the same with a covering of edible material unaffected by said filling, the filling thereafter becoming liquid-thin by said reaction and dissolving said crust of sugar.

2. The process of making liquid-filled crustless confectionery, which comprises rolling a mass of essentially dry sugar, obtained by evaporating a sugar syrup solution in vacuo, into a thin sheet, winding said thin sheet on to a pipe, withdrawing from said pipe the body of sugar thus obtained in the form of a continuous tube, closing said continuous tube of sugar on one end and filling the tube as it is withdrawn from the pipe with a filling which is forced through the pipe, said filling containing a swellable material selected from the class consisting of solubilized starch and pectins, and a material adapted to cause a swelling of said swellable material and a maximum of 40 percent dry matter, the viscosity of said filling being initially high and gradually decreasing due to reaction of said swellable material with said swelling material until a liquid-thin state is reached, forming said continuous tube of sugar filled with said filling of high viscosity into confectionery consisting of said filling covered with a crust of sugar, and providing the same with a covering of edible material unaffected by said filling, the filling thereafter becoming liquid-thin by said reaction and dissolving said crust of sugar.

3. The process of claim 2 wherein said covering material is chocolate.

4. The process as in claim 2, in which corn flour is used as said swellable material.

5. The process as in claim 2, in which said filling contains further cocoa powder.

6. The process as in claim 2, in which said material adapted to cause a swelling of said swellable material is a sugar-solution.

7. The process as in claim 6, in which an aqueous sugar-solution is used.

8. The process as in claim 6, in which a sugar-solution containing alcohol is used.

References Cited in the file of this patent

UNITED STATES PATENTS

| | | |
|---|---|---|
| 1,076,751 | Davidson | Oct. 28, 1913 |
| 2,682,471 | Alther | June 29, 1954 |

FOREIGN PATENTS

| | | |
|---|---|---|
| 398,193 | Great Britain | Sept. 8, 1933 |

OTHER REFERENCES

"A Course in Confectionery," vols. I and II, by Clyne, printed by The Sidney Press Ltd., London and Bedford. Copyright, November 1955. Pages 64, 65, 94, 95, 119, 172 and 173.